3,228,916
ANIONIC POLYMERIZATION OF E-CAPROLAC-
TAM WITH CYANOGEN HALIDE AS ACTIVATOR
Edward W. Pietrusza, Morris Township, Morris County,
and Rudolph Pinter and Jack R. Pedersen, Morristown,
N.J., assignors to Allied Chemical Corporation, New
York, N.Y., a corporation of New York
No Drawing. Filed Nov. 15, 1961, Ser. No. 152,674
4 Claims. (Cl. 260—78)

This invention relates to solid polymers of ε-caprolactam of high molecular weight and to a process for the production of said polymers.

Many processes have been proposed in the past for the preparation of solid polymers of lactams such as ε-caprolactam. These processes have been based either upon the hydrolytic polymerization of ε-caprolactam in the presence of various acidic and basic catalysts, or upon the anionic polymerization of ε-caprolactam under anhydrous conditions in the presence of an alkali or alkaline earth metal salt of the lactam as the sole catalytic agent. A singular disadvantage of these prior art processes is the necessity of conducting said processes at temperatures in excess of about 215° C. in order to obtain a satisfactory rate and degree of polymerization of ε-caprolactam. In order to obtain said satisfactory rates temperature ranges extending from about the melting point range of polycaproamide (ca. 215–225° C.) up to about 270° C. are commonly employed. An inherent failing in the use of such high temperatures is that the degree of polymerization tends to decrease as the temperature of the reaction system is increased. It is well known that the polymerizability of ε-caprolactam is influenced by a chemical equilibrium between the lactam and the polymer produced therefrom. Above about 215° C., appreciable proportions of ε-caprolactam are observed at equilibrium, and below said temperature polycaproamide is almost the sole product. Hence, the polymeric products frequently formed by the above-descibed prior art processes contained about 10% monomeric material. Consequently, in order to obtain a polyamide possessing suitable physical properties, it was frequently necessary to resort to operations designed to remove the undesirable monomer present in the polycaproamide. Furthermore, the molecular weight of the polycaproamide produced by these prior art processes was relatively low, i.e., the polymeric products exhibited a maximum reduced viscosity in 0.5% m-cresol solution at 25° C. of about 3.5, which is equivalent to a weight average molecular weight of the order of 100,000. In addition, in those instances wherein it was desirable to transform polycaproamide into molded shapes, it was necessary to heat said polymer to a temperature in excess of its melting point for extrusion or injection. The polycaproamide melt, however, being extremely viscous, is not suitable for the preparation of shaped objects of any great size.

Finally, the polyamides produced by the prior art processes described hereinabove have a tendency to discolor in air at elevated temperatures commonly employed in molding or extrusion operations. Said discoloration has been attributed to oxidative attack upon the primary amino end groups found in these polyamides.

We have discovered that the inherent disadvantages of the above-described prior art processes are overcome when polymerizing a lactam under anionic polymerization conditions by supplying to the reaction mixture a cyanogen halide. Suitably the metal salt of a lactam used as anionic catalyst of polymerization is formed by heating an alkali metal or alkaline earth metal, or a basically reacting inorganic or metal-organic alkali or alkaline earth metal compound with the lactam. Suitably the proportion of said metal salt catalyst ranges from about 0.1 to about 10 equivalent weights of metal per 100 equivalent weights of lactam; and the proportion of said metal in the metal salt catalyst to said cyanogen halide is within the range from about 1.1:1 to about 20:1 expressed in equivalent weights.

Our process is applicable to lactams generally, including 2-pyrrolidone, 2-piperidone, epsilon-caprolactam, enanthic lactam, omega-caprylic lactam, and their homologues. Our process will be illustrated, for convenience, by particular reference to epsilon-caprolactam.

By utilizing a cyanogen halide in conjunction with an alkali or alkaline earth metal lactam salt catalyst in the polymerization of lactam such as ε-caprolactam, one is able to obtain an extremely high rate of polymerization as well as a high degree of polymerization at temperatures considerably below the melting point of polycaproamide, i.e., at temperatures well below 215° C. The ability to utilize such low temperatures creates an equilibrium reaction mixture consisting almost entirely of polycaproamide. Hence, one is able to obtain polymeric products representing at least 95% monomer conversion. Such degree of monomer conversion is highly desirable in that removal of residual monomer from such products is unnecessary.

Aside from the obvious economic advantages derived from the employment of such a relatively low temperature process, other incidental advantages are afforded. For example, polycaproamides prepared by the process of our invention have molecular weights considerably higher than those which have been generally achieved by the polymerization of ε-caprolactam by the prior art processes disclosed hereinabove. Thus, polycaproamide of reduced viscosities in m-cresol at 0.5% concentration and 25° C. in the range of 3.5–15 are readily produced, which reduced viscosities are equivalent to weight average molecular weights of the order of 100,000–1,000,000. Such high molecular weight materials show high levels of tensile strength and toughness.

In addition, the polymerization of liquid monomer by the process of our invention, with practically complete reaction and practically no by-product formation, allows polymerizing ε-caprolactam monomer directly in molds which can be of intricate design.

A further advantage is that various filler materials such as sand, pigments, blowing agents, and, if desirable, plasticizers can be readily incorporated into polycaproamide in a very convenient manner. These materials may be homogeneously admixed with monomeric ε-caprolactam, which may then be converted to filled or foamed polymeric materials. Such a polymerization process provides an extremely uniform distribution of the filler or other additive throughout the resulting polymer.

Still another advantage is that the polycaproamide produced by our invention has N-cyano groups as end groups in the polymeric product in place of the primary amine end groups formed in those polyamides produced by the processes above-described. The presence of N-cyano group confers considerable oxidative stabilization to polycaproamide as will be evident upon examination of experimental data of the table below.

In accordance with a preferred form of our invention, an alkali metal or hydride thereof is admixed under anhydrous conditions with ε-caprolactam to form a reaction mixture comprising from about 0.1 to about 10 equivalent weights of said metal per 100 equivalent weights of lactam. The temperature of the reaction mixture is subsequently elevated to about 90–130° C. to complete the interaction of said alkali metal or metal hydride with an equivalent quantity of ε-caprolactam. The metal caprolactam/salt/ε-caprolactam mixture thus produced is efficiently agitated while being maintained at a temperature of about 120–180° C., and a cyanogen halide is added thereto in an amount such that the ratio of equivalent weights of said metal: equivalent weights of said cyanogen halide lies within the range from about 2:1 to about 10:1.

The interaction of the alkali or alkaline earth metal or compound thereof with ε-caprolactam can be illustrated by Equation 1:

(1)
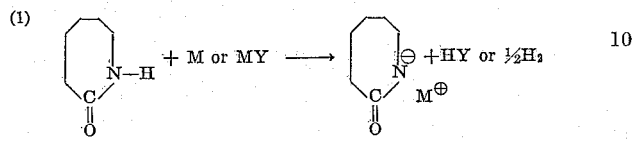

wherein M may be an alkali or alkaline earth metal such as lithium, sodium, potassium, rubidium, cesium, calcium, magnesium, etc., in their elemental or cationic states, and Y may be an anionic species such as hydride, hydroxide, carbonate, amide, oxide, etc. and those carbanions derived from such hydrocarbon species as the alkanes, cycloalkanes, arylalkanes and the benzenoids. Illustrative examples of the last named species are

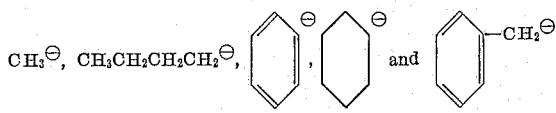

Although our process in the examples which follow will be largely illustrated by reference to the employment of lithium hydride, it is to be understood that the same principles of operation generally apply to all of the above-defined metals and metal compounds and to lactams generally.

The subsequent addition of a cyanogen halide to the reaction mixture produced by the process described in Equation 1 results in the rapid interaction of said cyanogen halide with said reaction mixture. Although we do not wish to be bound by any mere theory, it is believed that said cyanogen halide reacts with the metal ε-caprolactam salt present in the reaction mixture to form, in situ, the novel compound N-cyano-ε-caprolactam. The process whereby this is believed to occur is depicted by Equation 2:

(2)
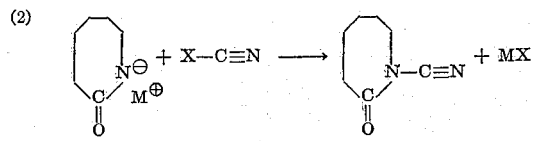

wherein M is as above defined and X is a halogen. The N-cyano-ε-caprolactam thus prepared is an extremely reactive species under the process conditions of our invention, and functions as a cocatalyst or promoter in conjunction with the above-described metal ε-caprolactam salt to promote rapid, low temperature polymerization of ε-caprolactam. The overall process illustrating our novel polymerization can be illustrated by Equation 3:

(3)
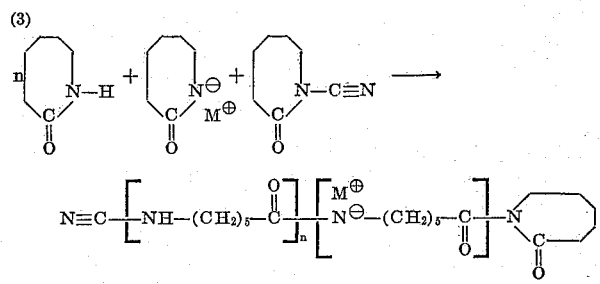

wherein $n$ is an integer ranging from $1 \times 10^3$ to $1 \times 10^4$.

Inasmuch as the N-cyano-ε-caprolactam must interact with metal ε-caprolactam salt to initiate the polymerization process, it is necessary that metal ε-caprolactam salt remain present after the in situ formation of N-cyano-ε-caprolactam. This may be readily achieved by admixing a quantity of a cyanogen halide with an ε-caprolactam/metal ε-caprolactam salt mixture such that the ratio of equivalent weights of metal in said mixture to equivalent weights of cyanogen halide added thereto is substantially greater than one. Preferably the molar ratio of said ingredients ranges from about 2:1 to about 10:1 although molar ratios ranging from about 1.1:1 to as high as about 20:1 may be used if so desired. In accordance with said molar ratios the mol percentage of the above described metal ε-caprolactam salt in the initial reaction mixture ranges from about 0.1% to about 10%. Preferably, however, mol percentages ranging from about 0.3% to about 2% of the total reaction mixture are employed. Inasmuch as the quantity of metal caprolactam salt is derived from the quantity of alkali or alkaline earth metal or compound thereof added to the reaction mixture, the quantity of said metal or compound thereof to be used necessarily follows from these ratios.

Although reaction temperatures suitable for the polymerization of ε-caprolactam may range from about 120° to about 215° C., it has been found convenient to perform said polymerization process at temperatures not above about 200° C., preferably in the range of about 160 to 180° C.

The cyanogen halides which are employed in this process may be readily prepared by procedures well known in the art. To cite a particular example, cyanogen iodide may be readily prepared by the process disclosed in Organic Syntheses, vol. 32, p. 29 (1952), wherein an aqueous solution of sodium cyanide maintained at 0° C. is admixed with elemental iodine to produce cyanogen iodide in a yield of 77% of theoretical.

It is necessary that the polymerization process as disclosed herein be performed under substantially anhydrous conditions. Those compounds which are capable of functioning as proton donors, e.g., acidic hydrogen compounds such as acids and water, are to be excluded from the reaction mixture. These compounds readily interact with the metal organic species present in the reaction mixture and inactivate said species from further polymerization by replacing the metallic cation moiety of said species with a proton. Those species which are readily deactivated are the metal caprolactam salts described in Equations 1 and 3, the metal alkyls, aryls, cycloalkyls, amides and hydrides employed to form said salts, and the polymerized unit disclosed in Equation 3. Furthermore, under the process conditions disclosed herein the presence of proton donating species may function to hydrolyze either N-cyano-ε-caprolactam or ε-caprolactam to their corresponding omega amino acids. Although it is extremely difficult to obtain an absolutely pure anhydrous system the quantity of water and/or proton donating species should be kept at a minimum, preferably less than about 50 p.p.m.

Although the polymerization process is preferably conducted by adding cyanogen halide to a reaction mixture containing metal caprolactam salt and caprolactam, a reverse procedure my be utilized if desired, i.e., the cyanogen halide may be added to the bulk caprolactam and the alkali or alkaline earth metal or compound thereof may be added thereafter. Alternatively, if desired, it is possible to add the cyanogen halide simultaneously with the alkali or alkaline earth metal or compound thereof.

Although the metal ε-caprolactam salt is preferably prepared in situ immediately prior to its utilization in the polymerization process, the addition of alkali or alkaline earth metal or compound thereof to ε-caprolactam may be made earlier if desired. The mixture formed by such an early addition has been found to be stable for a period of at least one month at a temperature of about 20–25° C. At higher temperatures, e.g., 90° C. the time of stability is diminished to about 4 days.

The following specific examples further illustrate our invention wherein temperatures are in ° C.

EXAMPLE 1

ε-Caprolactam containing less than 50 p.p.m. water was prepared by flash distilling said caprolactam at 100 to 115° under 3–5 mm. Hg pressure. The dried caprolactam thereby obtained was admixed with sufficient lithium hydride to form a mixture containing 0.84 mol of lithium hydride per 100 mols of lactam. Said mixture was charged to a reactor maintained under anhydrous conditions and heated to 160° for 1.5 hours under a dry nitrogen blanket to produce a reaction mixture comprised of 0.84 mol percent lithium caprolactam salt. The resulting reaction mixture was maintained at 160°, and under constant agitation with a mechanical stirrer, sufficient cyanogen bromide was added thereto to produce a mixture containing 0.24 mol of cyanogen bromide per 100 mols of lactam employed. Within 4 minutes a distinct increase in viscosity of the system was observed indicative of incipient polymerization. Within 30 minutes the entire melt solidified and shrank away from the reactor walls. After an additional 2.5 hours at 160°, the solid plug thus formed was cooled to ambient temperatures (ca. 25°) and solid polycaproamide was obtained. The product was light yellow in color. The product after grinding, hot water washing, and drying exhibited a reduced viscosity of 8.9 in 0.5% m-cresol solution at 25°. Analysis of the reaction mixture revealed a degree of monomer conversion of 95.3%.

EXAMPLE 2

In a process similar to that described in Example 1, a reaction mixture of epsilon-caprolactam and 0.84 mol percent lithium caprolactam salt was admixed at 160° with a quantity of cyanogen iodide sufficient to supply to the mixture 0.24 mol of said cyanogen iodide per 100 mols of lactam employed. After 3 hours at 160°, the reaction mixture was cooled to ambient temperature (ca. 25°) to form solid polycaproamide containing at least one cyano end group.

EXAMPLE 3

In a process similar to that described in Example 1, a reaction mixture containing 0.84 mol percent lithium caprolactam is admixed at 160° with a sufficient quantity of cyanogen chloride to form a mixture containing 0.24 mol percent of said cyanogen chloride. A solid polycaproamide having essentially the structure described in Example 1 is obtained.

In order to demonstrate the remarkable oxidative stability of the polymers of the present invention, the polymer sample prepared as described in Example 1 was heated in an air circulating oven at 165° for 6 hours. For purposes of comparison a sample of polycaproamide prepared by conventional hydrolytic polymerization, and a sample prepared by anionic polymerization employing lithium hydride as the sole additive, were treated in the same manner. All the samples were originally white-yellow in color. A comparison of the amount of discoloration obtained is illustrated in the table, wherein the change of color is expressed in terms of the Gardner color standard, Table

| Polymer Sample | Discoloration (increase in Gardner color index) |
| --- | --- |
| Example 1 | 0 |
| Hydrolytic Preparation (Control) | 6 |
| Lithium Hydride Catalyst (Control) | 12 |

It is evident from the above table that considerable discoloration to a dark brown material resulted with the control polymer samples whereas the polymer sample produced by our process remained a light yellow color.

While the above describes preferred embodiments of our invention, it will be understood that departures can be made from the details above, within the scope of the specification and claims.

We claim:
1. In a process for polymerizing a lactam under anionic polymerization conditions involving anhydrous conditions and the presence of a metal salt of the lactam, in which the metal is of the group consisting of alkali metals and alkaline earth metals, the improvement which comprises supplying to the reaction mixture cyanogen halide.

2. Improvement as defined in claim 1, wherein the ratios of equivalent weights of metal in the lactam metal salt catalyst used: equivalent weights of cyanogen halide supplied are in the range 1.1:1–20:1.

3. Improvement as defined in claim 2 wherein the lactam polymerized is epsilon-caprolactam, the metal caprolactam salt used as catalyst is the lithium salt, the cyanogen halide supplied is cyanogen bromide, and the temperature of polymerization is in the range of about 120° C.–180° C.

4. A process for the preparation of shaped articles of polycaproamide which comprises supplying a mold under substantially anhydrous conditions with a reaction mixture epsilon-caprolactam and a metal salt of epsilon-caprolactam, and supplying cyanogen halide to the reaction mixture as promoter, with the mol percentage of said metal salt ranging from about 0.1% to about 10% and the ratio of said metal salt: said cyanogen halide within the range from about 1.1:1 to about 20:1 expressed as equivalent weights; and maintaining the resulting reaction mixture at temperatures in the range between about 120° C. and about 215° C. until a solid article having the shape of the mold has been formed.

References Cited by the Examiner

UNITED STATES PATENTS

| | | | |
| --- | --- | --- | --- |
| 2,241,321 | 5/1941 | Schlack | 260—78 |
| 2,526,078 | 10/1950 | Kropa et al. | 260—78 |
| 2,805,214 | 9/1957 | Zimmerman | 260—78 |
| 2,865,912 | 12/1958 | Pohlemann et al. | 260—239.3 |
| 2,933,491 | 4/1960 | Klager | 260—293.3 |
| 3,015,652 | 1/1962 | Schnell et al. | |
| 3,017,391 | 1/1962 | Mottus et al. | 260—78 |
| 3,022,274 | 2/1962 | Glickman et al. | 260—78 |

FOREIGN PATENTS 842,576   7/1960   Great Britain.

OTHER REFERENCES

Hall, J.A.C.S., vol. 80 (1958), pp. 6404–6409.
Noller: Chem. of Org. Cpd., 2nd edition, 1957, W. B. Saunders Co., Philadelphia, p. 320.

WILLIAM H. SHORT, *Primary Examiner.*

H. N. BURSTEIN, JOSEPH L. SCHOFER, *Examiners.*